United States Patent [19]
Cunningham et al.

[11] 3,982,335
[45] *Sept. 28, 1976

[54] SHOE UPPERS

[75] Inventors: Victor Ralph Cunningham, Hutton; David Leonard Boutle, Maldon, both of England

[73] Assignee: Porvair Limited, England

[*] Notice: The portion of the term of this patent subsequent to Apr. 24, 1990, has been disclaimed.

[22] Filed: Oct. 12, 1971

[21] Appl. No.: 188,572

Related U.S. Application Data

[63] Continuation of Ser. No. 819,656, April 28, 1969, abandoned, which is a continuation-in-part of Ser. Nos. 620,792, March 6, 1967, abandoned, and Ser. No. 697,154, Jan. 11, 1968, abandoned.

[30]     Foreign Application Priority Data
Jan. 11, 1967    United Kingdom............... 1608/67
Jan. 11, 1967    United Kingdom............... 1609/67
Mar. 7, 1966    United Kingdom............... 9974/66

[52] U.S. Cl................ 36/45; 260/2.5 AY; 260/2.5 M; 264/41; 264/49; 427/373; 427/385; 428/212; 428/305; 428/425; 428/904

[51] Int. Cl.² ................ B32B 3/00; B32B 5/14

[58] Field of Search ............... 260/2.5 AY, 2.5 M; 264/41, 49; 117/11, 63, 55, 34, 161 KP; 161/159, 165, 190, DIG. 2; 36/45; 427/373, 385; 428/305, 425

[56]         References Cited
          UNITED STATES PATENTS

| | | | |
|---|---|---|---|
| 3,130,505 | 4/1964 | Markevitch | 161/159 |
| 3,262,805 | 7/1966 | Aoki | 117/11 |
| 3,348,963 | 10/1967 | Fukushima | 117/63 |
| 3,409,495 | 11/1968 | Rasmussen | 161/55 |
| 3,449,153 | 6/1969 | Saligny et al. | 117/63 |
| 3,486,968 | 12/1969 | Mater | 161/190 |
| 3,496,001 | 2/1970 | Minobe et al. | 117/11 |
| 3,531,305 | 9/1970 | Dumbaugh, Jr. | 106/47 |
| 3,729,538 | 4/1973 | Cunningham et al | 161/159 |
| 3,763,301 | 10/1973 | Civardi et al. | 161/DIG. 2 |
| 3,764,363 | 10/1973 | Civardi et al. | 161/DIG. 2 |

*Primary Examiner*—William J. Van Balen
*Attorney, Agent, or Firm*—Watson, Cole, Grindle & Watson

[57]         ABSTRACT

A shoe upper having in place of the upper leather thereof a fleeceless water vapor permeable microporous sheet of elastomeric polyurethane material having a thickness of about 0.8 – 1.8 mm. and having an extension at break of at least 200%.

8 Claims, 6 Drawing Figures

SHOE UPPERS

This is a continuation of application Ser. No. 819,656, filed Apr. 28, 1969 which is a continuation-in-part of applications Ser. No. 620,792, now abandoned filed Mar. 6th, 1967 and Ser. No. 697,154 filed Jan. 11th, 1968 (abandoned in favor of Ser. No. 90,192 filed Oct. 2, 1970 which matured into U.S. Pat. No. 3,729,538), whose disclosure is incorporated herein.

This invention relates to shoe uppers and more particularly to new materials for use as a replacement for shoe upper leather.

In the manufacture of shoes, it is customary to cut the upper leather, usually with a die by machine, and to fit and assemble the parts of the upper together (including any doubler or lining that is to be used) as by stitching and/or cementing so as to ready the upper for lasting. After the insole has been secured to the bottom of the last, the upper is placed on the last, pulled over the wooden last so as to conform tightly to it, and attached to the insole. This "pulling over" is generally effected by mechanisms which grip, and pull, the upper at its edges, e.g. at the toe and sides.

After pulling over, it is common to heat set the upper on the last to relieve stresses that have been set up in the material during lasting so that the shoe retains the shape of the last more closely; typical recommended heat-setting conditions for the most common microporous leather substitute are in the range of some 3 to 5 minutes in an oven whose air temperature is 300°F.

During the fitting together of the upper, the edges of the upper leather are generally "skived", by cutting a bevel on the "flesh side" of the leather adjacent its edge and the skived edge is then cemented, folded back on itself and pressed in place, to give a neat finished top line or other edge.

Descriptions of the conventional methods for making shoes are contained in the 61 page publication "How American Shoes Are Made", copyright 1961 by United Shoe Machinery Corporation and in the Encyclopedia Brittanica article on "Shoes".

Microporous leather substitutes, comprising a fibrous base such as a relatively thick woven or non-woven fabric impregnated with, and coated with, a much thinner layer of microporous polymer such as a polyurethane, are well known in the art and sheets of such products have been used extensively for replacements for leather in men's (and women's) shoe uppers. The thicknesses of the sheets are the same as those of leathers used for the same purpose. Thus, for men's shoe uppers the suitable thickness of the sheet material is about 60–70 mils (about 1.5–1.8 mm) while for women's shoe uppers the suitable thickness is about 30–45 mils (about .8–1.1 mm); most of this thickness, in each case, is occupied by the fibrous fabric or "fleece" and the microporous polyurethane layer above the fabric is relatively thin (e.g. about 0.25–0.4 mm in thickness). The non-woven impregnated felt or other fibrous fabric layer is used to impart strength, (e.g. tear strength), flexibility and other leatherlike properties to the material, while the thin overlying polyurethane layer gives resistance to surface abrasion and to ingress of liquid water. The article on "Poromeric Materials" by J. L. Hollowell of E. I. duPont de Nemours & Co. Inc. in the Encyclopedia of Chemical Technology, Vol. 16 page 345 ff, published 1968 by Interscience points out the importance attributed to the presence of the fibrous substrate and, in discussing "the field of shoe uppers, one of the largest and most physically demanding of markets for leather", states that "the unique microporous, highly interwoven, graded fibrous structure of leather is largely responsible for its value and success in this critical end use". Most commonly the fibrous base layer is made of a batt of non-woven fibers which has been needle-punched to lace the fibers together and provide some fiber orientation for laminar strength and has then been impregnated with a polymer without so completely filling the interstices between fibers as to destroy the breathability of the porous fibrous matt which serves as the essential base layer of the product.

According to the present invention the upper leather is replaced by a fleeceless sheet material which does not have a fibrous reinforcement. Throughout its thickness (which is the same as that heretofore used for upper leathers and for the substitutes thereof described above) the material consists essentially of non-fibrous elastomeric microporous polyurethane material.

Unlike the conventional upper leather substitutes which have ultimate elongations of some 20–60%, it can be stretched over 200%, for example, some 250, 300 or even 500 or 700%. Although its stretchability differs greatly from that of conventional leather and upper leather substitutes, it can be lasted readily in conventional manner. Uppers (made by using the new material in place of upper leathers) not only conform unusually well to the last, without wrinkling or puckering, but also retain their lasted shape very well after removal from the last, particularly when the upper has been given the conventional type of heat setting treatment (e.g. setting with heat alone or moist heat) on the last. The material has very good skiving characteristics, particularly if it is wet with water prior to skiving.

A problem which is frequently encountered in the use of conventional upper leather substitutes is the "orange peel" effect. That is, although the material has a relatively uniform smooth appearance before lasting, it is found that, under the forces exerted on the upper during lasting, the top surface of the material takes on a bumpy appearance similar to that of an orange peel. This effect is most noticeable at the toe of the shoe. The materials of the present invention are found to be entirely free of this defect.

Shoes made with natural leather uppers often become comfortable only after a "break-in" period during which the leather becomes permanently distorted from its as-lasted shape to a shape conforming to the foot of the wearer. Conventional substitutes for upper leathers do not have this property to a significant degree; with shoes made of such materials it is customary for the shoe salesman to "overfit"; that is, he suggests the purchase of a size in which the wearer's foot has more room. The material of this invention also does not become significantly permanently distorted during wear. It returns to substantially its original lasted shape overnight. However, shoes made of the material of this invention have been found to be immediately comfortable on the foot without overfitting; it appears that because of its stretchiness the material readily accommodates itself to the particular shape of the wearer's foot without exerting such pressures as would make the shoes uncomfortable, even for people with bunions.

Another advantage of the sheet material of this invention is in its substantial isotropy. That is its properties (e.g. tenacity, notch tear strength, initial modulus, elongation at break, etc.) are very similar in both the lengthwise and widthwise directions; for instance the numerical values of the properties measured lengthwise and widthwise are generally within 30% and preferably within 15% of each other. In this respect it is unlike leather and the common leather substitutes whose anisotropy, or orientation in one direction, limits the way in which pieces can be cut from the sheet during the manufacture of shoes. The use of the novel sheet material of this invention therefore permits the cutter to make use of much more of the area of the sheet.

The tear strength of the sheet material of this invention is usually considerably less than that of the conventional upper leathers or upper leather substitutes used in the manufacture of comparable shoes. Thus while a conventional leather substitute used for the making of the uppers of men's dress shoes has a notch tear strength of 10 kg or above and the leathers (e.g. natural black calf) used for the same purpose have similar tear strengths, a men's weight material of the present invention often has a notch tear strength of, say, about 4 to 5 kg. This would be expected to militate strongly against the use of the new material in ordinary shoes of stitched construction in that it would be anticipated that extensive tearing at the stitches would take place. Experience has shown however, that conventional shoemaking stitching techniques can be employed with substantially no more tearing occurring than with the conventional upper leathers and substitutes therefor. This ability to withstand stitching even when the tear strength is low is believed to be related to the stretchiness of the material. For women's shoes, thinner materials of this invention of even lower notch strength (e.g. some 2½ to 3 kg) have been employed successfully.

The elastomeric polyurethanes used for making the preferred products of this invention are thermoplastic materials soluble in organic solvents such as dimethylformamide. Materials of this type are well known in the art. For example the thermoplastic elastomeric polyurethanes sold under the name "Estane" by B. F. Goodrich, which are understood to have few, if any, chemical cross links and are believed to derive their properties primarily from hydrogen bonding forces rather than cross linkage are described in the article by Stetz and Smith in Rubber Age, May 1965, page 74; the typical stress-strain curves given in that article are reproduced here in FIG. 5. The material sold as Texin is another suitable elastomer. Very good results have been obtained with the polyester-based polyurethane elastomer known as Elastollan TN 61 EH 98 AK, made by reacting a hydroxyl-terminated polyester (e.g. of adipic acid and a glycol) of molecular weight about 2000 with butylene glycol and 4,4'-diphenylmethane di-isocyanate. According to the manufacturer's published specifications this material, when compression molded to produce a non-porous structure such as a film or sheet (with further polymerization occurring, as is well known, during such molding similar to the polymerization which occurs when the material is dissolved in a solvent such as dimethylformamide, probably due at least in part to further reaction occurring between previously unreacted hydroxyl and isocyanate groups which are present in the elastomeric material), has a Shore D hardness of $50 \pm 3$, a density of 1.23 g/cm$^3$; a tensile strength of over 450 Kg/cm$^3$, a modulus at 100% elongation of 120 Kg/cm$^3$, a modulus at 300% elongation of 180 Kg/cm$^3$, an elongation at break of 450% (all as measured by DIN53504); a "Stosselastizitat" of over 30%; a tear strength (Streifen, DIN53507) of 50 Kg/cm; and a tear strength (Graves, DIN53515) of 90 Kg/cm.

It is also within the broader scope of the invention to use elastomeric polyurethanes derived from precursors other than polyesters, e.g. polyether diols. The polyester precursor may have other groups in the chain; e.g. it may be a polyester amide. The molecular weight of the polyurethane may be in the range of 20,000 to 400,000. Polycaprolactone may be used as the polyester.

While the density of the preferred polyurethanes is about 1.2 g/cm$^3$ the apparent density of the microporous sheet material of this invention is of course considerably lower (e.g. in the range of about 0.4 to 0.6 and most preferably about 0.4 – 0.5 g/cm$^3$).

In the accompanying drawings,

FIG. 1 is a schematic cross-sectional view illustrating the conventional lasting of a shoe upper, FIG. 2 is a diagram illustrating a preferred range of compositions used in the manufacture of the novel material, FIG. 3 is a flow diagram of a preferred process for making a single layer or substrate material, FIG. 4 is a diagrammatic side elevation showing the use of a melt roll coating machine, FIG. 5 shows stress-strain curves of thermoplastic elastomeric polyurethanes. The upper curve was obtained with a polyurethane similar to, or identical with, that present in the material of Example 19, but in the form of an injection molded film 1 cm wide and about 2 mm thick; the curve was obtained during testing at 23°C on an Instron tensile testing machine in which the sample was extended at a constant rate of 76.9% per minute. The other two curves are copies of published curves for Estane polyurethanes.

FIG. 6 shows a shoe made in accordance with this invention.

In one preferred form of the invention the sheet material is made up of a plurality of superimposed layers. One layer, (hereinafter called "the base layer") constitutes the major part of the thickness and can be formed by forming, on a temporary support, a layer of a solution of the thermoplastic elastomeric polyurethane in a solvent therefor, treating the layer on the support with a coagulating liquid which is a non-solvent for the polyurethane but is at least partially miscible with the solvent so as to coagulate the polyurethane into a microporous sheet, and a washing with fresh coagulating liquid or continuing the treatment until substantially all the solvent has been removed, drying the resultant water vapour permeable flexible sheet material, and stripping it from the temporary support.

In a preferred form of the invention the method comprises also the addition of a particulate removable filler, which is preferably water soluble for example, sodium chloride, in the solution of polyurethane. Whilst the inclusion of a removable filler enables improved water vapour permeability to be obtained, the fact that the structure is somewhat more open tends to result in loss of toughness or wear resistance or resistance to tear propagation. Accordingly, the ratio of removable filler to polyurethane is preferably less than 3 to 1 in parts by weight.

The washing of the material to remove the solvent and the filler may be merely immersing the material in coagulating liquid or may be washing with fresh coagulating liquid or continuing the treatment with the liquid used to achieve the actual coagulation.

In one form of the invention the temporary support is porous and is sufficiently rough to cause the base layer to adhere to it.

The temporary support may be formed of a porous polymeric plastics material, for example, a sheet of sintered granulated plastics material, for example, high density polyethylene.

The temporary support may be one which is formed by spreading an even layer of polymeric plastics material granules on a smooth metal surface and then placing the smooth metal surface and the layer in a suitably heated oven to cause the granules to sinter, the surface of the sintered sheet which was in contact with the smooth metal surface being smoother than the other face of the sintered sheet and the base being formed on the smoother face of the sintered sheet.

In one form of the invention the base layer has a thickness between 0.050 and 0.120 inches and the surface layer has a thickness greater than 0.005 inches but less than 0.050 inches.

The base layer may comprise a material having a WVP of at least 2000 g/m²/24 hrs, a tensile strength of at least 20 lbs/inch width/mm thickness, in both the L and X directions, an initial module (measured at 5% elongation), of at least 4 lbs/in. width/mm thickness in both the L and X directions, an extension percent of some 300 to 400% (e.g. 330% or 360%) or more in both the L and X directions, and a notch tear strength of at least 5 lbs/mm thickness in both the L and X directions.

The water vapour permeability values (WVP) are expressed in grams/square meter/24 hours and can be determined by the method described in British Standard Specification No. 3177/1959 but carried out at 38°C with a nominal humidity gradient of 100% relative humidity.

Tensile strength, initial modulus, extension percent and notch tear strength may be measured on a Houndsfield Tensometer. Tensile strength, extension percent (or ultimate elongation) and initial modulus may be measured in a continuous test on a single sample. The material to be tested has an L direction, the direction of travel of the material during its formation, and an X direction, the direction at right angles to the L direction. For each material separate tests are made in the L and X directions. These are done on two samples 6 inches long and ¼ inch wide cut from the material to be tested with the lengths of the samples parallel to the L and X directions of the material respectively. The samples are mounted in the tensometer with their ends gripped in the jaws of the machine. The samples are then loaded to produce a constant rate of extension of 4 inches per minute. The initial modulus used herein, is defined in terms of the load required to produce a 5% extension in length, while the tensile strength is defined in terms of the load at which the sample ruptures, and the extension percent (or elongation at break) represents the % increase in length of the sample at the time of rupture.

Notch tear strength is measured on a specially shaped standard sample. As for the other three properties the samples are 6 inches long and ¼ inch wide and are cut with their lengths in the L and X directions respectively. In addition a small notch is cut at the mid point of one side and a small corresponding bulge is formed opposite the notch and extending outwards from the other side. The samples are in fact punched out of the material to be tested. The notch propagates a tear in the test and the notch tear strength used herein, is defined in terms of the load required to rupture this sample.

The surface layer may be attached to the fleeceless base layer by being formed directly on it. A method of forming the surface layer comprises dispersing a solid removable filler in the polyurethane when the latter is in a plastic or liquid state and then removing by evaporation any solvent used so as to form a homogeneous mixture of the filler and the polyurethane, heating the mixture so that the polyurethane is at least rendered plastic and forming the surface layer of the heated mixture directly on the base layer, and exposing the material to a leaching agent so as to remove the filler but not to adversely affect the surface layer or the base layer polyurethane, the ratio of filler to polyurethane and the conditions during the formation of the surface layer being selected to ensure that a continuous layer is formed and that the structure of the layer is such as to enable the filler to be removed to form a porous surface layer and to ensure that the properties of the base layer are not adversely affected.

If the surface layer were to be formed directly on the base layer by coagulation from a solution of a polymer in a solvent difficulty could arise in that when the mixture for the second layer is applied to the already formed first layer, the solvent in the former might partly dissolve the surface of the latter and adversely affect its structure, for example by collapsing its micropores and lowering the water vapour permeability. To overcome this difficulty a third or tie layer may be interposed between the base layer and the surface layer. Such a method comprises forming each of the three layers from or with the aid of a solution of a polymer in a solvent, the material of the base layer being shaped to form that layer and the solvent being removed from it whereafter the material of the tie layer is deposited on the base layer and the solvent removed from it, and the material of the surface layer is deposited on the tie layer and the solvent removed from it, the materials being so chosen that the base layer polyurethane is not substantially soluble in the tie layer solvent and the tie layer polymer is not substantially soluble in the surface layer solvent, under the conditions involved.

In the preferred procedure, in which the base layer is made from a solution of the polyurethane containing a removable filler, it is found that reduction of the amount of filler beyond a certain point, dependent on the ratio of "working material" (i.e. the polymeric material) to solvent, results in a material having a structure, herein termed "cellular", which comprises a microporous matrix having interconnected micropores providing permeability, and a number of much larger pores, which will be called macropores, which do not extend from face to face of the sheet and (unlike micropores) are of such size (e.g. about 100 microns in diameter or larger) as to be visible to the unaided eye when a cross section of the sheet is viewed in normal daylight. In the preferred structure, which may be termed "non-cellular", on the other hand, there are not only no macropores at the surface of the sheet but the microporous structure is more nearly homogeneous. In general the "cellular" structure tends to be weaker and less tough than the non-cellular structure. It is found that the formation of the preferred non-cellular structure is promoted when the ratio in parts by weight of filler to working material and the ratio in parts by weight of working material to solvent in the mixture fall within the area defined by the closed figure DQLMD, more preferably A-K-L-M-A, and most preferably RSTUR, of the diagram, FIG. 2 of the accompanying drawings.

A fuller disclosure of this feature and the conditions and materials to be used therefor is found in the copending applications of Cunningham et al Ser. Nos. 697,154 and 697,165, both filed on Jan. 11, 1968, (now U.S. Pat. Nos. 3,729,538 and 3,791,997 respectively) whose entire disclosures are incorporated hereby by reference.

Preferably the ratio in parts by weight of filler to working material is in the range 1.5 to 1 to 2.0 to 1 and the ratio in parts by weight of working material to solvent is in the range 30:70 to 35:65. Preferably the filler is ground so that more than 50% of the particles have diameters in the range 4 to 20 microns. The average diameter of the particles may be in the range 10 to 14 microns and is preferably 13 microns: the standard deviation on either side of the average being 4.5 microns. This particle size will be referred to as 13 ± 4.5 microns (one standard deviation) in the rest of the specification. A suitable filler is sodium chloride. These particle sizes are measured by means of a Photo-extinction Sedimentometer manufactured by Evans Electro Selenium Ltd., Model No. 41 used in accordance with the manufacturers' instructions based on papers by H. E. Rose in "Engineering" of 31st March and 14th April 1950 and "Nature" of 1952 Volume 169 page 287.

The precise ratio of working material to solvent and of filler to working material at which the cellular structure occurs depends to some extent on the particle size of the filler, and if the particle size of the filler is reduced the range of parameters within which cellular structure is found to occur will be reduced.

It is found that for a given weight of filler, a reduction of filler particle size tends to increase the permeability of the product without markedly affecting its tensile strength.

It is thought that within the area A-D-Q-K-A a "non-cellular" material can be obtained if the particle diameter of the filler as measured by the method described above is predominantly less than 10 microns. However, it is preferred not to work in this area in view of the uncertainty which exists as to which structure will be obtained.

Within the range represented by the area A-K-L-M-A of the diagram, FIG. 2, of the accompanying drawings it is believed that a "non-cellular" structure can be achieved with a wider range of particle size.

It appears that if the moisture content of the sodium chloride is very much lower than 0.2–0.4% e.g. less than 0.05% w. or much greater e.g. above 0.5% the tendency for macropores to occur is increased. It is thus preferred to use salt with a moisture content of about 0.2–0.4% w. Similarly the results obtained under milling conditions more humid than 50% RH at 25°C seems to dicate a tendency for increased occurrence of macropores with increased humidity. It is thus preferred to use milling conditions of about 50% RH at 25°C. It is also desirable for the milling to be very thorough to ensure that the dispersion of the salt in the polyurethane solution is homogenous since formulations which are not sufficiently milled are liable to have macropores.

Provided the ratios fall within the preferred area R-S-T-U-R macropores are unlikely to be produced. However, in the case of the particle sizes at the low end of the range quoted above, the tendency of the sodium chloride to absorb moisture is increased and care must be taken to ensure that the preferred moisture content of 0.2.–0.4% w for the sodium chloride mentioned above is not exceeded and the preferred milling conditions set out above are fulfilled. In addition the coagulation temperature should be kept down if macropores are to be avoided.

In a preferred procedure for making the multilayer product, the mixture which forms the "surface layer" is deposited on the layer of mixture which forms the "base layer" before the coagulation of the latter and the two layers are coagulated simultaneously; a fuller disclosure of this procedure are the conditions and materials to be used therein is found in the previously mentioned Cunningham et al application Ser. No. 697,165 (now U.S. Pat. No. 3,791,997). As described therein, and in the application Ser. No. 620,792 filed Mar. 6, 1967, the surface layer may be made from a mixture containing a higher proportion of salt than is used in this mixture from which the base layer is derived, and in the resulting product the surface layer will be considerably less dense, more permeable to water vapor, have a lower strength per unit thickness, and have less resistance to initial stretching than the base layer. The presence of such a surface layer has little effect on the strength and modulus of the product. For example, if the base layer taken alone has an initial modulus of 4 lbs/inch of width per mm thickness, which for a material having a thickness of 0.050 inches, [1.26 mm] corresponds to a stretching force of 5.2 lbs/inch of width (about 0.9 kg/cm) to produce a 5% extension in length of that base layer, the force necessary to produce a similar extension of the multi-layer men's weight product (having a surface layer, as described, about 0.5 mm in thickness, on the base layer) will be some 10% (or even less than 10%) greater than that for the base layer. Preferably the initial modulus of the product (at 5% elongation) is at least about 0.7 kg/cm.

The microporous fleeceless material of the present invention is supple, stretchy, flexible and pliant to the hand as is a good natural leather. Its nature is thus quite dissimilar from the relatively hard stiff tough nature of the non-microporous solid form of the polyurethane from which it is made.

Unless the material is to be used as a suede, it will generally be given a surface finish which can be imparted by lacquering or embossing such as to render the surface appearance akin to that of finished natural leather. One preferred finishing technique which imparts a high quality calf grain appearance to the surface of the material is that disclosed in Hull application Ser. No. 621,124 filed Mar. 7, 1967 (now U.S. Pat. No. 3,689,629), (whose entire disclosure is incorporated herein by reference), in which the upper surface of the material is sprayed with a solvent and subjected to hot air so as to collapse the microporous structure at the surface, thus forming a thin skin of polyurethane at said surface. These finishing treatments can be applied to the upper surface of the multi-layer sheet material or to the upper surface of the base layer itself (i.e. a single-layer material). The finishing treatment may also be such, if desired, as to reduce the water vapor transmission of the material considerably by forming a thin skin of much less permeable material thereon.

EXAMPLE 1

FIG. 3 is a flow diagram of the process for the preparation of a single layer (or substrate) material.

General description of the process

Referring to FIG. 3 the main stages of the process are numbered 32 to 80. There are two ancillary stages, those of grinding the sodium chloride to a narrow range of fine particle sizes, stage 20, and manufacturing the backer, stage 25. The backer is a sheet of porous sintered high density polyethylene and is formed by spreading an even layer of Ziegler high density polyethylene powder on a smooth metal conveyor belt, passing the layer on the belt through a suitably heated oven to cause the particles to sinter, cooling the sintered sheet and stripping it from the belt. The surface of the resultant sintered sheet which was in contact with the smooth metal surface is smoother than the other face, and it is on this smoother surface that the mixture is spread.

In general terms the main stage of the process consists of preparing a substrate paste containing a solution of a polyester based polyurethane dissolved in dimethyl formamide, and finely divided sodium chloride. These are stages 32 and 35. The substrate paste is used to form the materials in accordance with the present invention which find particular uses as substrates for man-made leather-like materials. Optional additional coatings may be formed on the material in accordance with the present invention, or it may be provided merely with a surface finish.

A layer of the substrate paste is spread on the backer. This is stage 40.

The coated backer, held under suitable tension throughout this stage of the process, is smoothly immersed, coated face down, in water and washed with water (for example at 20°C) until the polyurethane has all been precipitated out of solution and all the dimethyl formamide has been removed. These are stages 50 and 55. The remainder of the sodium chloride is then removed by leaching with water heated (for example to 60°C) and the material dried with the layer uppermost, care being taken that the heating does not warp the backer. Twenty minutes in an oven at 120°C is suitable. These are stages 60 and 65.

After being dried it is carefully stripped from the backer. This is stage 70. It may be easier to do this whilst the material is still hot. This process imparts a fibrous or flesh surface appearance to the surface which was in adherence with the backer.

The backer is then treated to enable it to be reused if possible and returned to stage 25 of the process for reuse or recovery.

The material is then inspected and tested, stage 75, and if it comes up to specification may optionally be given further coatings as mentioned above and/or a surface finishing treatment by spraying with dimethyl formamide and drying. This procedure may be in accordance with the invention disclosed in U.S. Pat. No. 3,689,629 filed Mar. 7th, 1967. This is stage 80. This imparts a high quality calf grain appearance to the surface of the material. It may also be given other optional treatments mentioned below.

Detailed description of the process.

Stage 20 Grinding the filler

Figure 1:
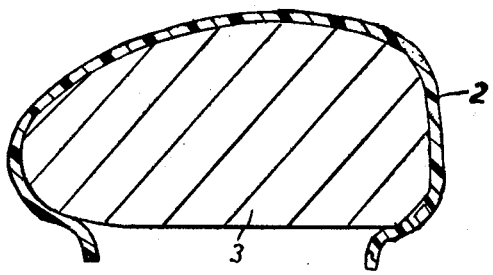

In a preferred procedure, the majority of the particles are between 4 and 20 microns in diameter the preferred average particle diameter being 13 ± 4.5 microns (one standard deviation). The particle size of the salt is measured, on a test suspension, in the manner previously described.

Care must be taken to ensure that the particles in the test suspension have not agglomerated and this can be achieved by applying ultrasonic vibrations to the test suspension; these of course must be such as not to break up the individual particles but merely any agglomerates. The grinding is performed by re-circulating the sodium chloride between a grinder producing particles somewhat on the coarse side and a classifier which separates the particles that are too coarse and returns them to the grinder. Typically approximately 50% of the total mass is returned for regrinding. The grinder may be of the type comprising a pair of co-axial discs which can be rotated at different speeds or in opposite directions, each disc having concentric rings of pegs projecting from it and lying between the rings of pegs of the companion disc.

The material which is ground consists of sodium chloride crystals having a moisture content not in excess of 0.2–0.4% w to which are added between 0.4 and 0.7% w. of a coprecipitated lime and silica anti-caking agent for example that sold as Microcal 160 (Trade Mark) by Joseph Crosfield & Sons Limited. The ground sodium chloride is sealed in cans and stored under dry conditions so that the moisture content of the ground salt does not exceed 0.2–0.4% w. and is preferably about that value.

Stage 25 Manufacturing the backer

The temporary backer is a sheet of porous synthetic plastics material, formed by spreading an even layer of Ziegler high density polyethylene powder and sintering as described above.

The material is 22 inches wide, 0.067 ± 0.004 inch thick, has a permeability of 18 ± 4 cubic ft. air/minute at a pressure of 8 inches static water gauge and weighs 114 gram/ft.$^2$.

Stages 30 to 36 Preparing the substrate paste

The working material from which the man-made leather-like water vapour permeable flexible sheet material is made is a polyester based polyurethane which is made as follows.

The starting material is a linear polyester containing hydroxyl groups which is made from adipic acid and ethylene glycol, which has a molecular weight of approximately 2,000 a hydroxyl index around 50 and an acid number of 1. 1,000 g. of this polyester is heated to approximately 120°C with 90 g 1,4-butylene glycol, both re-agents having been adequately dessicated beforehand. 400 g. of solid 4,4'-diphenylmethane diisocyanate is added to the heated mixture with vigorous stirring, which is continued until the solid has dissolved, the temperature reaching about 100°C. After about two minutes the liquid is poured on to plates preheated to between 110°C and 130°C. After about ten minutes the mass is stripped from the plates, allowed to cool to room temperature, and granulated in a conventional granulating machine. This material has a Shore hardness of 98 on the A scale at 25°C. A 10% w. solution in dimethyl formamide has a viscosity of the order of 15 to 30 centipoise at 25°C.

In a modification of this material part of the ethylene glycol is replaced by 1,4-butylene glycol so that the basic polyester is in fact a copolymer of two diols.

The material may also contain conventional stabilisers.

Figure 2:
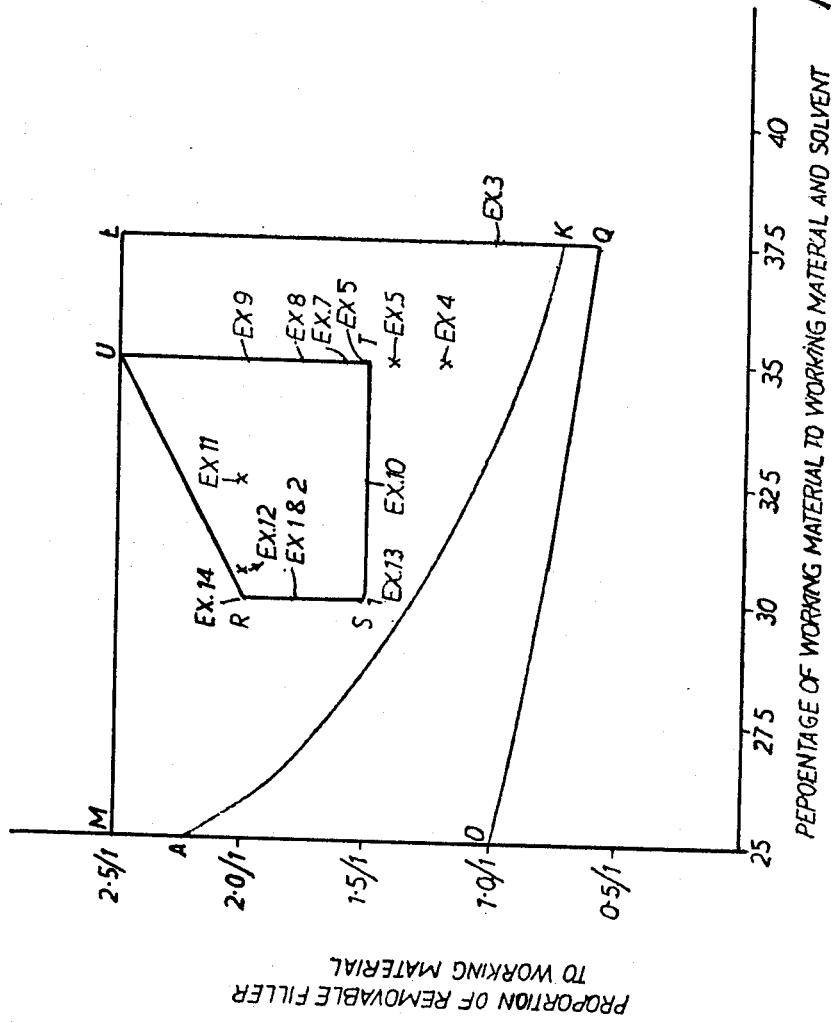
Figure 3:
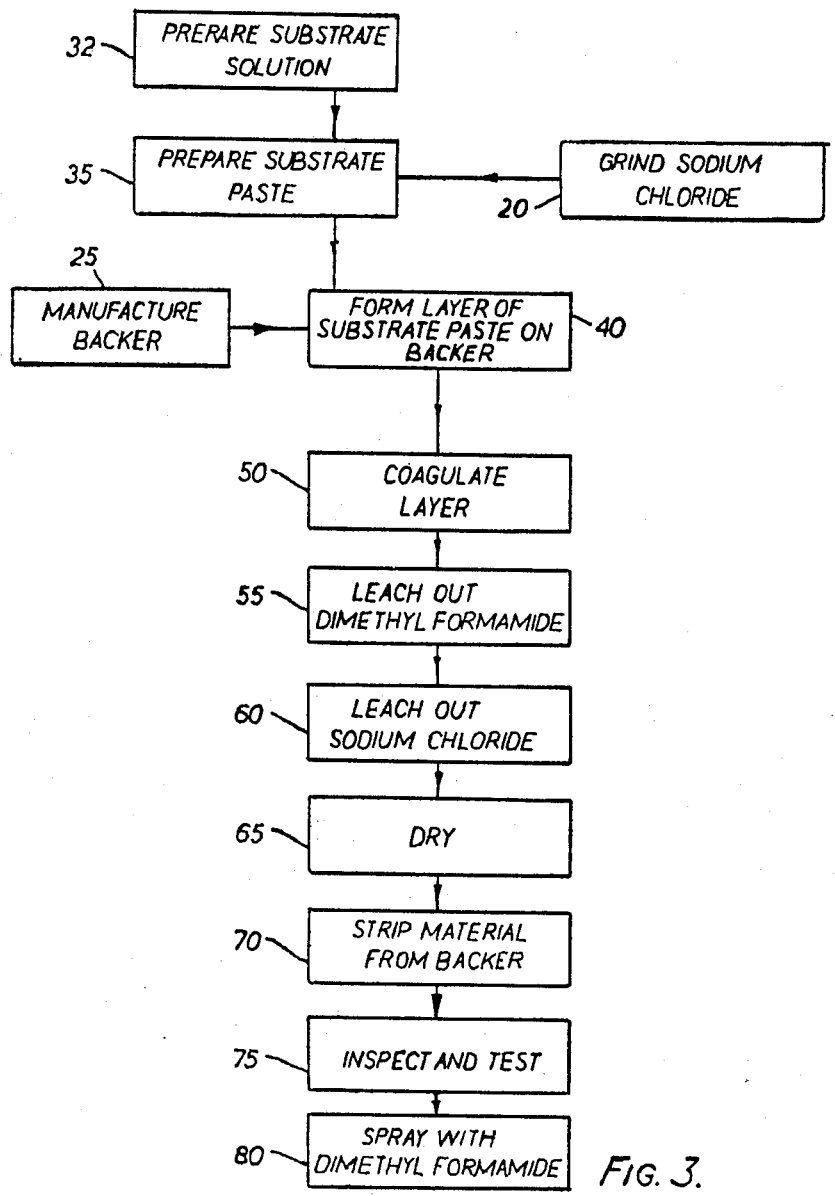

Stage 32 of FIG. 2, preparing the substrate solution, is carried out by weighing out 3 parts by weight of this polymer and dissolving this in 7 parts by weight of dry dimethyl formamide (less than 0.01% of moisture, supplied by I.C.I. Ltd. in accordance with their specification for dry dimethyl formamide) in a vertical mixer with a high rate of shear, e.g. a Silverson mixer. Care must be taken to keep the temperature below 40°C during mixing or degradation of the polyurethane is liable to occur. The substrate solution is stored under dry conditions.

Care must be taken when handling dimethyl formamide solutions since the vapour is toxic and also hygroscopic. Thus when possible the mixing stages are enclosed and are kept at low humidity ideally less than 50% RH at 25°C. Stage 35, preparing the substrate paste, is carried out as follows. 100 parts by weight of filtered substrate solution are placed in a paddle type mixer and 53.4 parts by weight of ground salt taken from sealed cans is added after being sieved through a 60 mesh British Standard screen in a vibratory sieve.

This is mixed in a paddle type mixer and then milled on a Torrance triple roll mill to produce a homogenous dispersion. Two passes through the mill produces a dispersion which, when tested with a Hegman Gauge, is indicated by a reading of 6.5 to 7 to have present no particles greater than 14 microns in diameter. This dispersion, the substrate paste, is stored under dry conditions. To summarise the substrate paste has the following composition:

Polyurethane (15–30 centipoise at 25°C) 30 parts by weight

Ground sodium chloride (average particle diameter 13± 4.5 microns (one standard deviation) 53.4 parts by weight Dimethyl formamide 70 parts by weight It has a viscosity of the order of $1.5 \times 10^6$ centipoise at 25°C.

Stage 40 Forming the layer.

The backer which has been stored under dry conditions is passed round an 18 inch diameter ground steel spreading roll underneath a doctor knife blade and down under a guide roll into a coagulating tank.

The substrate paste is mixed to eliminate any settling of the sodium chloride and de-aired under vacuum in a mixer and then supplied to the doctor knife.

This is set to provide a gap setting between the backer and the blade such that a 0.090 inch wet coating 18 inches wide is produced. This layer when leached and dried weighs 450 grams/m² and is 0.050 inch or 1.2 mm. thick.

Stage 50 coagulating the layer

As mentioned above the coated backer enters the tank by passing under a guide. Located along the inside of the side walls of the tank are horizontal channels through which slide the uncoated edges of the 22 inches wide backer. The backer emerges out of the tank around a guide roll and through a constant speed wind up arrangement driven by a variable speed motor and gearing and is fed on to a wind up roll.

The backer with the layer on it is run at 4'/minute into the tank of water maintained at 20°C with, it will be appreciated, its coated face downwards. The layer is thus immersed within about half a minute of being formed. The entry to the water is done as smoothly as possible so as to avoid the formation of ripples on the surface of the layer.

Alternatively the coating may be passed through an atomised spray of water just before it is immersed.

The channels and the tension in the backer hold it about 2 inches below the surface of the water. Fresh water is pumped into the tank from both ends and the level is maintained by an overflow at the centre of the tank. The water is maintained at 20°C by a steam jacket 507 at the bottom of the tank and plastic balls 506 floating on and covering the surface of the water.

The material is passed into the 60 ft. long tank and the total immersion time is 45 minutes. This is to allow the microporous polyurethane which precipitates out of solution in a few minutes to harden off. The material is kept with the coated surface down during this stage to prevent any air in the backer rising or being forced through the polyurethane layer thus forming bubbles or macropores.

The layer of polyurethane contracts during precipitation but the backer is tensioned and is such that warping and shrinkage in length or breadth does not occur to any disadvantageous degree.

Stage 55, leaching out the dimethyl formamide, is carried out as follows. The material is wound up on a roll which is transferred to a static cold water holding tank where the coils of the roll are allowed to loosen slightly. The material is held in this tank until the amount of dimethyl formamide left in the material is not sufficient to cause collapse of the porous structure on heating. About two hours are required for this stage.

Stage 60 Leaching out the sodium chloride

The material from the holding tank is passed in loops and through mangles with loads of about 300 lbs through a series of leaching tanks arranged so that the water is fed in countercurrent to the material. This takes about 4 hours. The water is heated at 60°C. This removes sufficient sodium chloride to result in a satisfactory product.

Stage 65, drying the material, is carried out by passing the wet material coated side uppermost through an oven at 120°C in twenty minutes. Any salt remaining tends to be deposited out in the backer rather than in the layer and thus does not interfere with the solvent spraying, stage 80.

This temperature and time in the oven does not cause the backer to warp.

Stage 70 Stripping the material from the backer

The material is separated from the backer, taken round a roll past circular edge trimming knives and wound up on a constant speed wind up roll, driven via a friction clutch so as to prevent undue stretching of the material. The backer is returned to the sintering plant for recovery or re-use and the material goes to Stage 75, inspection and testing. The material may then be given further coatings and/or be spray finished as mentioned above.

The material produced by this process, after spraying with the solvent, has the appearance of a high grade calf grain leather and this man-made leather-like material can be used as a replacement for such materials, for example as a men's shoe upper material.

Photomicrographs indicate that it has a fine even interconnecting pore structure.

EXAMPLE 2

The procedure of Example 1 was followed except that the coagulating temperature was 40°C. The sheet when dried was 1.2 mm thick and was "non-cellular". The water vapour permeability of the product was measured by the dessicant method, a figure of 4000g/m$^2$/24 hours being obtained. The product showed satisfactory wear properties.

\* The dessicant method for determining water vapour permeability is as described in BSS 3177/1959 but carried out at 38°C with a nominal humidity gradient of 100% relative humidity.

EXAMPLES 3 to 14

The procedure of Example 1 was followed but with the following different formulations.

| Example | filler:working material ratio | working material solvent ratio |
|---------|-------------------------------|--------------------------------|
| 3 | 1:1 | 37.5:62.5 |
| 4 | 1.2:1 | 35:65 |
| 5 | 1.4:1 | 35:65 |
| 6 | 1.5:1 | 35:65 |
| 7 | 1.6:1 | 35:65 |
| 8 | 1.78:1 | 35:65 |
| 9 | 2.0:1 | 35:65 |
| 10 | 1.5:1 | 32.5:67.5 |
| 11 | 2.0:1 | 32.5:67.5 |
| 12 | 2.0:1 | 30.6:69.4 |
| 13 | 1.5:1 | 30:70 |
| 14 | 2.0:1 | 30:70 |

Alternatively or in addition the material can be lacquered.

The material can alternatively be supplied by known techniques with one or more additional coatings, which may then be spray finished and/or lacquered.

EXAMPLE 15

Mixture 1

Base layer working material

A thermoplastic polyester based polyurethane, the proprietary material sold by Elastollan Limited under the Trade name ELASTOLLAN TN61 EH98AK.

Solvent - DMF (i.e. N,N-di methylformamide)

The working material is dissolved in the solvent to form Mixture 1 and a layer of this is formed on a temporary support. This is provided by the smoother surface of a 1/16th inch sheet of sintered high density Ziegler polyethylene; this sheet has an average pore size of 50 microns. (BSS 1752/1952)

The layer is formed by doctor knife coating using a gap setting of 0.095 inches. The material is then immersed in and washed with water at 70°C until all the working material has come out of solution and all the DMF has been removed from the layer. This takes about 12 hours. The layer on the sheet is then dried at 100°C for 30 minutes.

The base layer so produced has a tie layer formed on it and a surface layer formed on the tie layer.

The tie layer

The base layer still attached to the temporary support is doctor knife coated with a layer of the following mixture using a gap setting of 0.015 inches.

| The layer working material | 25 |
|---|---|
| A thermoplastic polyester based polyurethane, the proprietary material sold by B.F. Goodrich Company under the Trade name ESTANE 5701 Fl. | |
| Solvent - dimethylcyclohexanone | 75 |
| Removable filler - sodium chloride ground to a particle size range of 20–25 microns. | 75 |

The tie layer working material has a hardness of 90 on the Shore A scale on the solid continuous state at 25°C. The mixture is formed by triple roll milling followed by degassing under vacuum.

The layer is dried at 100°C for 15 minutes.

The surface layer

The dried surface of the tie layer is dooter knife coated with a layer of the following mixture using a gap setting of 0.035 inches.

| Surface Working material | 25 |
|---|---|
| ELASTOLLAN TN61 EH98AK | |
| Solvent - DMF | 75 |
| Removable filler - sodium chloride ground to a particle size range of 20 – 25 microns. | 75 |
| Pigment | 1.25 |
| The mixture is formed by triple roll milling and degassing under vacuum. | |

The composite sheet still attached to the temporary support is immersed in water at 20°C for 20 minutes and then washed in water at 80°C for 2 hours. It is then dried at 100°C for 1 hour, and then stripped from the temporary support.

The product of this example resembles a natural calf leather and can be used as a replacement for such a material.

The product has the following physical properties.

Thickness - 1.6 mms.

Tensile strength - L 80 × 72 (lbs/inch width/mm thickness)

Initial modulus - L 11 × 10 (lbs/inch width/mm thickness)

Extension percent - L 350 × 330

EXAMPLE 16

The base layer of Example 15 is stripped from the support and has a surface layer formed directly on to it by a melt roll coating process. The coating mixture used has the following composition.

| Surface working material | 100 |
|---|---|
| A thermoplastic caprolactone based polyurethane, the proprietary composition sold under the Trade name ELASTOLLAN TN65 EH90AK | |
| Removable filler - sodium chloride ground to a particle size range of 20 – 25 microns. | 400 |

Figure 4:
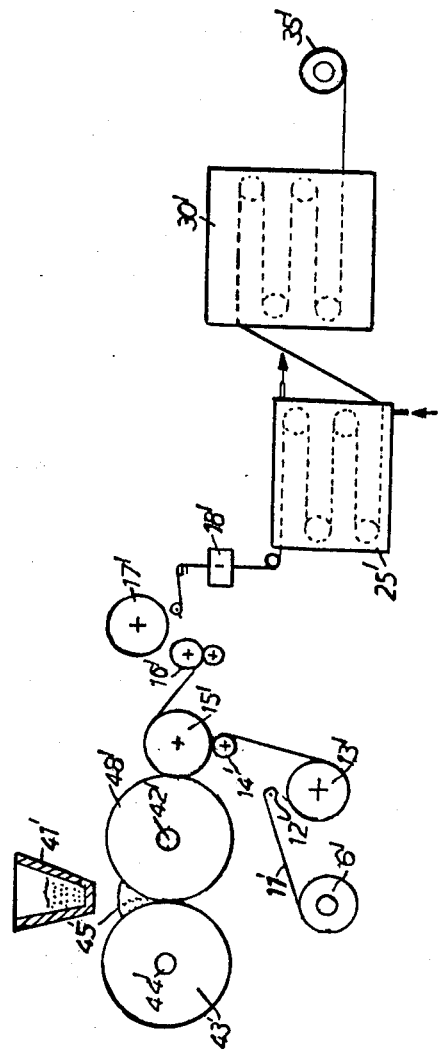
Figure 5:
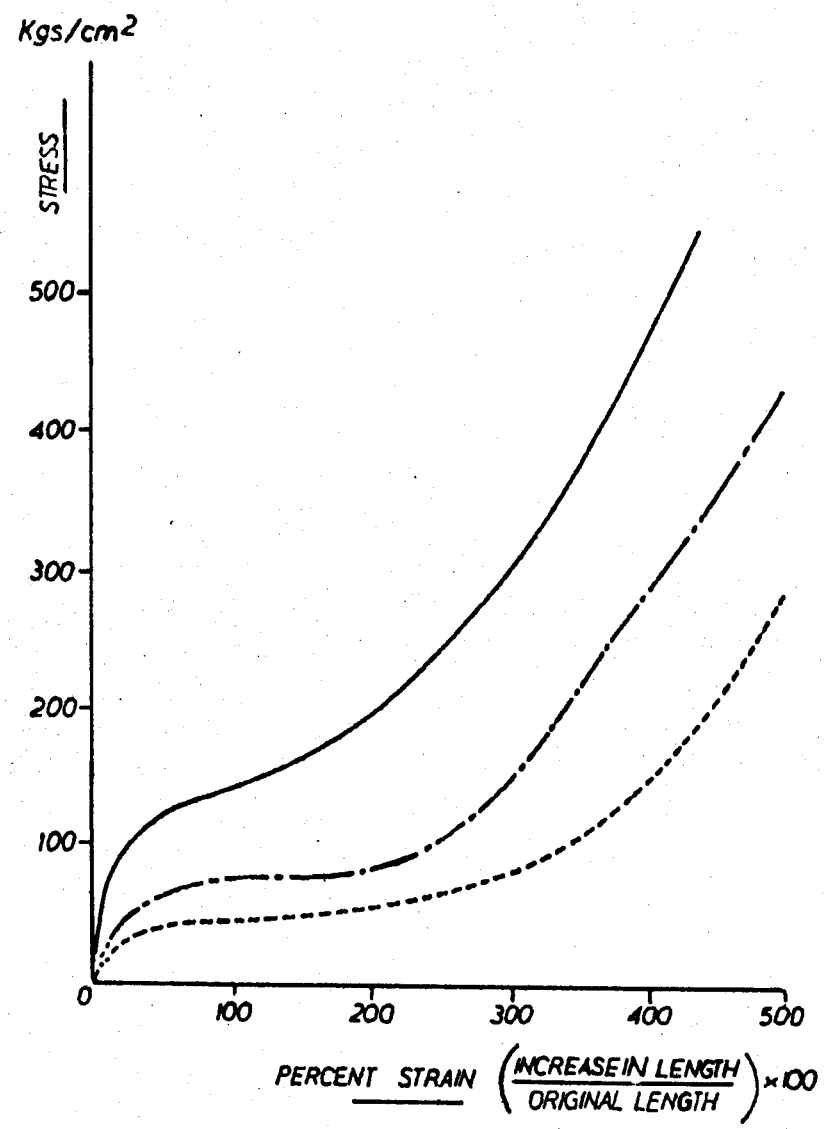

The coating process in this example involves the use of a melt roll coating machine as illustrated in FIG. 4. These machines comprise two essential aspects, a support or base layer line and a melt coat preparation line.

The support line comprises a horizontal winding-off stand 10' on which the support 11', the product of Example 15, or base layer is stored and from which it passes over a guide 12' located above a horizontal pre-heater roll 13' and thence under and around this roll. The base layer then rises up to and passes behind a horizontal guide roll 14' and then over a horizontal rubber covered take-off roll 15'. By means of the guide roll the base layer is caused to come into contact with the take-off roll at a point well below the axis of the take-off roll.

It is at this point in the process that the sheet of surface layer working material is applied to the base layer as a layer 0.015 inches thick.

The base layer with the surface layer on it then passes over the horizontal take-off roll 15' under a horizontal finishing roll 16' and thence around the major part of the periphery of a horizontal cooling roll 17' and through an edge trimming device 18' of any suitable sort. The surface layer on the base layer is then conveyed through leaching tanks 25', by a brush conveyor (not shown) preferably as described in the Present Applicant's British Application No: 24575/64 now British Pat. No. 1,110,799. After passing through the leaching tanks 25' the material then passes through a suitable drying oven 30', for example of the type disclosed in the application just mentioned, and thence to a re-winding stand 35'.

The melt coat preparation line comprises a feed hopper 41' which dispenses the homogeneous mixture of filler and working material prepared as described below to the nip 45' of a pair of large diameter rolls 40' and 43' which are arranged in the same horizontal plane as the take-off roll 15'.

The take-off roll 15' is movable horizontally in a direction perpendicular to its longitudinal axis and may thus be brought to bear with varying pressure against the transfer roll 40' of the melt coat preparation line. The take-off 15' and thus the support 11' and base layer are arranged to be moving at the same speed as the periphery of the transfer roll 40'.

The homogeneous mixture of filler and working material is prepared as follows.

A Banbury mixer type OOC manufactured by David Bridge & Co. Ltd. is used. Suitable mixing conditions are steam heating of the body and rotors using steam at 100 to 120 p.s.i. with the air pressure in the ram at 100 p.s.i.

A suitable mixing cycle is as follows:

All the solid working material in chip form is placed in the mixing chamber and the rotors run at slow speed. After 1 minute a small amount of salt is added, between 3 and 8 minutes the rest of the salt is added bit by bit together with any pigment, lubricants or other desired additives, care being taken not to overload the motor. The mixing conditions cause the temperature to rise during the period from 8 to 11 minutes to a value of 160° to 170°C. At 12 minutes when the temperature is at this value the rotor speed is increased to high. At 14 minutes the temperature of the mixture has risen to 180°C. This type of mixer has doors in the bottom of the mixing chambers. These are now opened and the batch of the homogeneous mixture of working material and filler drops down a short chute into a two roll mill where it is formed into flat pieces. These are then reduced to chip which is fed to the nip 45' of the melt roll coating apparatus.

The transfer roll 40' is, on a fixed axis 42' but the roll 43' is mounted on a movable axis 44', so that the nip 45' can be adjusted. The hopper 41' feeds the mixture to the nip between the other roll 43' and the transfer roll 40' which rotates in an anti-clockwise direction at a peripheral speed about 1.3 times greater than that of the other roll 43'. The rolls are arranged to be heated to temperatures sufficient to cause the working material to be plastic i.e. to be at a temperature above the lower limit of its plastic temperature zone. The temperature of the transfer roll 40' is between 1° and 20°C higher than that of the other roll 43'.

The temperature of the rolls, and the pressure between the nip are selected for the particular working material and working material filler ratio which is being used. These factors have to be selected by trial and error to suit the particular conditions at the time but are arranged to be sufficient to cause a continuous sheet of the working material to be formed on the surface of the transfer roll and to cause the sheet to be transferred to the base layer as a continuous surface layer. The values used in this example were 170°C for the roll 43' and 180°C for the transfer roll 40'. P is the pressure between these two rolls and is between 40 and 100 kgs/sq. cm; preferably about 60 kgs/sq cm. The rate of travel of the base layer is 5 meters/minute.

The sheet of surface layer has the filler homogeneously dispersed throughout it and thus when the sheet on the surface of the transfer roll 40' comes into contact with the base layer on the support 11' carried by the take-off roll 15' the sheet of surface layer is transferred to the base layer as a continuous surface layer. The surface of the surface layer on the base layer is then suitably finished by the finishing roll 16' to impart a smooth, matt or embossed surface of any desired form to the layer. The layer then passes over the cooling roll 17' which brings the temperature down to that at which leaching is to be effected.

The leaching agent is water at 60°C and the total dwell time in the leaching tanks 25' is of the order of one hour.

The product has a similar utility, after drying at 100°C for 1 hour, to the product of Example 15.

EXAMPLE 17

A 30% by weight solution (based on the total weight of the solution) in dimethylformamide of working material ELASTOLLAN TN61 EN98AK was prepared in Silverson mixer, keeping the temperature of the mixture below 50°C. Salt (sodium chloride) was mixed into the solution to give a ratio by weight of salt to working material of 1.78:1, and the mixture was then milled on a Torrence 3-roll mill and subsequently degassed. The formulation was then hand doctor-knife coated on to the smoother surface of a support formed of low permeability 1/16 inch porous sintered high density polyethylene sold under the Registered Trade Mark VYON (filter grade) and immersed in water at 40°C, coated face downwards, to coagulate the polymer. This treatment was continued until substantially all the dimethylformamide and salt had been removed from the sample which was then dried at 90°C, and stripped from the support.

The particle size of the salt was 13 microns as measured by means of a Photo-Extinction Sedimentometer manufactured by Evans Electro Selenium Ltd., Model No. 41 used in accordance with the manufacturers' instructions based on papers by H. E. Rose in *Engineer-*

*ing* of 31st March and 14th April, 1950 and *Nature* of 1952, Volume 169 page 287.

A tie layer and a surface layer are then applied as in Example 15. Alternatively a surface layer is formed directly on the base layer as in Example 16.

EXAMPLE 18

The procedure described in Example 1 is used, with additions noted below, to prepare a two-layer product, from two different pastes containing a solution of a polyester based polyurethane dissolved in dimethyl formamide, finely divided sodium chloride, and carbon black pigment, the first (or substrate paste) having more polymer, less salt, less pigment, and a higher viscosity than the second (or top coat) paste.

A first layer of the first paste is spread on the backer and then immediately a thinner layer of the other paste is spread on top of the first layer and the two layers are then coagulated, leached and stripped from the backer.

The steps of blending and curing the top coat polyurethane and preparing the top coat solution are carried out in a ribbon blender and a Silverson mixer identical to that used for Stage 32.

The polymer of 15 to 30 centipoise viscosity at 25°C in 10% w solution is cured and blended dry.

The curing is carried out at 75°C under an inert atmosphere, e.g. of nitrogen until the viscosity of 10% w solution of the cured polyurethane has risen to 70 to 90 centipoise at 25°C.

1 part by weight of the cured polyurethane is weighed out and mixed with 3 parts by weight of dry dimethylformamide in the same way as the substrate solution and stored under dry conditions.

The dimethylformamide is also stored under dry conditions.

The pigment master batch is prepared as follows. 60 part by weight of top coat solution are filtered to remove any agglomerations or undissolved solids. The filtered solution is then placed in the pot of a five gallon paddle type mixer, where it is mixed with 30 parts by weight of dry dimethylformamide and 10 parts by weight of carbon black pigment of 20 milli-microns average particle diameter. The mixture is then milled on a Torrance triple roll mill to produce a homogeneous dispersion and stored under dry conditions.

The milling is carried out in an air conditioned enclosure the filtered heated air taken in being kept at 25°C and a humidity of about 50% RH.

The substrate paste has the following composition:
Polyurethane (15–30 centipoise at 25°C) 30 parts by weight
Polyurethane (70–90 centipoise at 25°C) 0.23 parts by weight
Ground sodium chloride (average particle diameter 13±4.5 microns (one standard deviation)) 53.4 parts by weight
Dimethylformamide 71.13 parts by weight
Carbon black pigment 0.15 parts by weight
It has a viscosity of the order of $1.5 \times 10^6$ centipoise at 25°C.

The top coat paste is prepared as follows. 100 parts by weight of filtered top coat solution is placed in the pot of a paddle type mixer, 12.5 parts by weight of the pigment master batch is added and 80.63 parts by weight of ground salt taken from sealed cans is added after being sieved through a 60 mesh British Standard screen in the vibratory sieve. This is mixed in the paddle type mixer and milled in the triple roll mill in exactly the same way as the substrate coat paste in stage 35, and the resultant top coat paste is stored under dry conditions.

To summarize the top coat paste has the following composition:
Polyurethane (70–90 centipoise at 25°C) 26.86 parts by weight
Ground sodium chloride (average particle diameter 13±4.5 microns (one standard deviation)) 80.63 parts by weight
Dimethylformamide 84.38 parts by weight
Carbon black pigment 1.25 parts by weight
It has a viscosity of the order of $1.0 \times 10^6$ centipoise at 25°C.

A two-head coating apparatus, described and illustrated in application Ser. No. 697,165 (now U.S. Pat. No. 3,791,997), is employed The first coating blade is set to provide a gap setting between the backer and the blade of 0.100 inch such that a 0.090 inch wet coating 18 inches wide is produced. This layer if leached and dried weighs 450 grams/m.$^2$ and is 0.050 inch or 1.2 mm. thick.

The second coating blade is set at a total gap setting between the backer and the blade of 0.135 inch and produces a wet top coat 0.050 inch thick. The top coat when leached and dried weighs 200 grams/m.$^2$.

The coagulating of both layers is carried out in the manner described in Example 1, with the coagulating equipment described and illustrated in application Ser. No. 697,165 (now U.S. Pat. No. 3,791,977).

The material produced by this process after spraying with the solvent has the appearance of a high grade calf grain leather and this man made leather-like material can be used as a replacement for such materials, for example as a men's shoe upper material.

Photomicrographs indicate that it has a fine even interconnecting pore structure.

Another typical product made in accordance with the procedure in which a two-layer product is made by coagulating both layers at once (here using coagulating temperatures of 25°–30°C and leaching temperatures of 70°–80°C) has a substrate thickness of 0.95 mm, a top coat thickness of 0.75 mm and a weight per unit area of 747.6 g/m².

Its breathability is indicated by a water vapour permeability of 1455 g/m²/24 hours (measured by the desiccant method), whilst its resistance to the ingress of liquid water is indicated by a hydrostatic head of 9 cm. Hg. Hydrostatic head values can be determined by the method described in British Standard Specification No. 2823/1957.

EXAMPLE 19

This is an example of a material having a substrate and a top coat made of the same polyurethane and an interposed tie layer made of a softer polyurethane.

The polyurethane for the substrate and topcoat is made as follows: The starting material in a linear polyester, based on adipic acid and a mixture of ethylene glycol and 1,4-butane-diol.

The polyester has the following physical properties:

| | |
|---|---|
| Mean molecular weight | approx. 2000 |
| Hydroxyl value | 50 – 60 |
| Hydroxyl content | 1.5 – 1.8% |
| Acid value | <2.0 |
| Viscosity at 75°C | 500 – 700 centipoise |

| | |
|---|---|
| -continued | |
| Water content | <0.15% |

The polyester is thoroughly dehydrated under vacuum and 100 parts thereof are then weighed out into a reaction vessel and heated to 105°C and 22.7 parts by weight of warmed (50°C) liquid, 1,4-butane-diol added with stirring and the stirring continued for 30 seconds. 80 parts of powdered solid 4,4'-diphenylmethane-diisocyanate is then added in one batch and the mixture stirred thoroughly. The temperature of the reaction mixture falls initially to approximately 60°C but then rises rapidly again and after 90 seconds should have reached 80°C.

The liquid mixture is then poured into a tray heated to 125°C. After 3 minutes the now solid polymer is removed from the tray and placed on a cooled table until it has cooled to room temperature and then stored in closed bins for 12 to 24 hours, granulated, cooled, tumbled in a tumble blender until the granulate is completely homogeneous. At this stage, its intrinsic viscosity is about 0.3 to 0.5 deciliters/gram, (measured in solution in dimethylformamide containing, for instance, 1% methanol by volume to prevent polymerization of the material).

The polymer from which the topcoat was made in this example was made in the same way as the substrate polymer.

The polyurethane used in the tie layer was the commercially available material known as ESTANE 5740 × 1 of 5701 Fl. As disclosed in the article by T. T. Stetz and J. F. Smith in "Rubber Age" of May 1965 pages 74 – 79, these polyurethanes are made in accordance with United States Patent Specification No. 2,871,218.

A 35% solution of the substrate polymer was prepared by dissolving 7 parts of the solid granulated polymer in 13 parts of N,N'-dimethylformamide, ("DMF"). 40 parts of this solution were milled with 24.92 parts of finely ground sodium chloride, 0.8 parts of carbon black pigment base and 6.67 parts of DMF.

The salt had an average particle size of the order of 13 to 15 microns with a standard deviation of the order of ± 10 microns, measured as previously described.

The carbon black pigment base had the following composition: 24 parts of a 25% solution in dimethylformamide of the same polyurethane as used as the substrate polymer, 14 parts of dimethylformamide, and 5.4 parts of Rajah Black carbon black pigment. This pigment is made by the channel process by Columbian International and is stated by them to have a particle diameter of 0.02 microns, a surface area of 156 square meters per gram, an oil absorption to produce a fluid paste of 11.3 milliliters per gram and to produce a stiff paste of 1.23 milliliters per gram, a carbon content of 95.2%, and a volatile matter content of 4.8%.

This substrate paste mixture was then deaired by being stirred under reduced pressure and then spread as a 20 ft. length on the smoother surface of a belt of low permeability filter grade sintered polyethylene as sold under the Trade Mark VYON as described above in Example 1. The spreading was done with a knife over roll device using a knife gap of 0.100 inches at a speed of 2 feet per minute.

The layer was then immersed upside down in a stationary water bath at 20°C for 1 hour, and then transferred to and immersed in a large tank of stationary water at 50°C for 36 hours. The material was then dried at 90°C, the surface wiped with a damp rag to remove traces of sodium chloride on the surface and the substrate material redried at 90°C.

The substrate was then tie coated with the following mixture. A 23% solution of the Estane polyurethane described above was prepared by dissolving the solid polymer in dimethylcyclohexanone. 5 parts of this solution were milled with 3.35 parts of sodium chloride of the same particle size as described for the substrate paste in this example, and 0.225 parts of Estane carbon black pigment base. This pigment base had a composition similar to that used in the substrate but based on an ESTANE polyurethane.

This mixture was then deaired by stirring under reduced pressure and was then applied to the dried surface of the substrate using a knife over roll device at a knife gap of 0.015 inches and a speed of 3 feet per minute. The layer was then dried at 100°C which evaporated off the dimethylformamide.

The dried surface of the tie layer or tie coat was then surface coated with the following mixture. A 25% solution of the topcoat polymer was prepared by dissolving 6 parts of the solid polymer in 18 parts of dimethylformamide. 40 parts of this solution were milled with 31.5 parts of sodium chloride of the same particle size as described for the substrate paste in this example, and 3.7 parts of the same carbon black pigment base as used for the substrate.

This paste mixture was then deaired by being stirred under reduced pressure. It was then applied to the dried surface of the tie coat using a knife over roll device at a knife gap of 0.040 inches and a speed of 5 feet per minute. The layer was then immersed upside down in a stationary water bath at 25°C for 1½ hours and then transferred to a tank of water at 50°C for 48 hours, the water being pumped around the tank continuously.

The material was then mangled at 15 p.s.i. under water and dried at 90°C. The surface was then wiped with a soft slightly damp rag and redried. It was then sprayed with dimethylformamide to darken its surface and give a grain leather like appearance without reducing its water vapour permeability below an acceptable level, in the manner previously described. The amount of dimethylformamide used by the spray gun was of the order of 22 milliliters per square foot of the material. The material passed directly beneath a drying hood maintained at 100°–120°C supplied with a forced flow of air.

The material has the following physical properties. Weight in grams per square meter 707, (measured in accordance with British Standard Specification No. 3144:1959), thickness in millimeters 1.7, calculated density 0.41, tensile strength 14 kilogrammes per centimeter (measured in accordance with British Standard Specification No. 3144/1959 using a 10 centimeter long sample 2 centimeters wide extended at a constant rate of 12 centimeters per minute), elongation at break 375% (on the same test as for tensile strength), initial modulus 0.93 kilogrammes per centimeter (being the load per centimeter width of the sample at 5% strain on the same test as for tensile strength), water vapour permeability 3265 (measured in accordance with British Standard Specification No. 3177/1959 at 37°C and a nominal humidity gradient of 100%), notch tear strength 4.6 kilogrammes (measured in accordance with British Standard Specification No. 2782/1965 at a rate of extension of 12 centimeters per minute), hydrostatic head 140 millimeters of mercury, Satra vamp flex test at 21°C, survived more than 3 × 10⁶ cycles. The material had a smooth even surface finish in both the stretched and unstretched states and a "break", the pattern of fine creases when bent back on itself, closely resembling a good quality calf upper leather.

Figure 6:
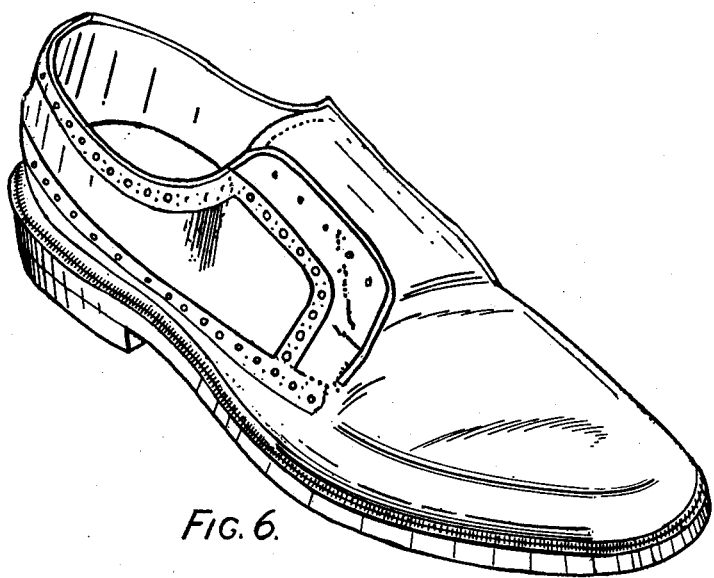

The material was made up into men's cemented construction no cap Derby shoes using conventional American shoe making techniques, as shown in FIG. 6.

EXAMPLE 20

This is an example of a material having a substrate and a topcoat made of similar polyurethanes and two interposed tie layers one immediately on top of the substrate made of a softer polyurethane and the other made of a polyurethane similar to that of the topcoat.

These two polyurethanes are made in the same manner as described in Example 19.

The physical properties of the substrate polymer in the form of a solid sheet injection moulded and cured at 80°C for 24 hours were as follows:

tensile strength (using the method set out in British Standard Specification No. 903:1963 part A2) 6407 p.s.i.; elongation at break (using the method set out in British Standard Specification No. 903:1963 part A2) 500%; compression set (using the method set out in British Standard Specification No. 903:1963 part A6) 2.5%; hardness (using the method set out in ASTM D1706-61)52 on the Shore D Scale; tear strength (using the method set out in British Standard Specification 903:1963 part A3) 95 lbs. per 0.1 inch thickness; and abrasion (using a DuPont machine and the method set out in British Standard Specification No. 903:1963 part A9) 308 (an index).

The softer polyurethane used for the first layer was an Estane 5701 F1 material as used in Example 19.

The harder polymer used for the second tie layer had the following physical properties measured in the same way as described for the substrate polymer:

tensile strength 5850 p.s.i.; elongation at break 500%; compression set 3.8% hardness 52 on the Shore D scale; tear strength 94.4 lbs. (per 0.1 inch thickness); and abrasion 324 (an index).

The polymer used for the topcoat had the following physical properties measured in the same way as described for the substrate polymer:

tensile strength 5500 p.s.i.; elongation at break 490%; compression set 2%; hardness 54 on the Shore D scale; tear strength 107 lbs. (per 0.1 inch thickness); and abrasion 490 (an index).

A 30% solution of the substrate polymer was prepared by dissolving 6 parts of the solid granulated polymer in 14 parts of N,N'-dimethylformamide. 50 parts of this solution were mixed and milled with 26.7 parts of finely ground sodium chloride and 0.52 parts of carbon black pigment base. The salt before milling had an average particle size of 15.25 microns with a positive deviation of 5.5 microns and a negative deviation of 4.5 microns. This measurement was made by sedimentation measurements as described above. The carbon black pigment base consisted of 36 parts of a 25% solution of the harder type of polyurethane in dimethylformamide, having a viscosity of 24.6 centipoise as a 10% solution at 25°C, mixed with 9 parts of Rajah Black carbon black (as in Example 19) and 21 parts of dimethylformamide.

This paste mixture having a ratio of salt to polymer of 1.78:1 was then deaired by being stirred under reduced pressure and then was spread as a 30 foot length on the smoother surface of a belt of low permeability filter grade sintered polyethylene as sold under the trade mark VYON as described previously. The spreading was done with a knife over roll device using a knife gap of 0.100 inches at a speed of 5 feet per minute. The layer was then immersed upside down in a stationary water bath at 28°C for 45 minutes, and then leached in cold water overnight and then dried at 100°C for 2to 3 hours.

The dried material was 1.2 mm. thick and had an average notch tear strength measured by the method described in Example 19 of 3.0 Kg. in the L and X directions.

The substrate was then given a first tie coat as follows.

A 23% solution of Estane 5701 F1 polyurethane was prepared by dissolving 6.17 parts of the solid polymer in 25 parts of dimethylcyclohexanone at 70°C using a high speed high shear mixer. 50 parts of this solution were then mixed and milled with 2.07 parts of Estane carbon black pigment base and 34.5 parts of sodium chloride of the same particle size as described for the substrate paste in Example 19. The pigment base consisted of 36 parts of 23% Estane solution in dimethylcyclohexanone, 9 parts of carbon black as described above, and 21 parts of dimethylcyclohexanone.

This paste mixture having a ratio of salt to polymer of 3:1, was then deaired by being stirred under reduced pressure and was then spread on the dried surface of the substrate using a knife over roll device with a knife gap of 0.015 inches at a speed of 3 feet per minute, and then passed through a 60 foot long oven maintained at 100°C at a rate of 4 feet per minute to remove the solvent.

A second tie coat was then formed on the first tie coat as follows.

A 25% solution of the second tie coat polymer described above was prepared by dissolving 25 parts of solid polymer in 75 parts of dimethylformamide. 50 parts of this solution were mixed and milled with 2.07 parts of carbon black pigment base and 34.5 parts of sodium chloride of the same order of particle size as that used in the substrate in Example 19.

The carbon black pigment base consisted of a mixture of 12 parts of a 25% solution in dimethylformamide of a polymer similar to that described as the second tie coat polymer, 3 parts of Rajah Black carbon black pigment as described in Example 19 and 7 parts of dimethylformamide.

This paste mixture having a ratio of salt to polymer of 3:1, was then deaired by being stirred under reduced pressure and was then spread on the dried surface of the first tie coat using a knife over roll device with a knife gap of 0.007 inches at a speed of 7 feet per minute. The coating was then heated in an oven at 100°C to remove the solvent.

A topcoat was then formed on the second tie coat as follows:

The tie coated material was preconditioned by being heated at 100°C for 15 minutes, to remove any moisture picked up by salt at the surface of the tie coat on standing.

A 25% solution of the top coat polymer was prepared by dissolving 6 parts of the solid polymer in 18 parts of dimethylformamide. 48 parts of this solution were then mixed and milled with 37.8 parts of finely ground sodium chloride and 4.5 parts of carbon black pigment base. The sodium chloride had an average particle size of 22.5 microns with a positive deviation of 10.5 microns and a negative deviation of 9.25 microns. This measurement was made by sedimentation measurements as described above. The carbon black pigment base consisted of 6 parts of 25% topcoat polymer solution in dimethylformamide, mixed and milled with 1.5 parts of Rajah black, and 3.5 parts of dimethylformamide.

The topcoat mixture, having a salt to polymer ratio of 3:1, was then deaired by being stirred under reduced pressure and was then spread on the dried surface of the second tie layer using a knife over roll device with a knife gap of 0.045 inches at a speed of 7 feet per minute. The layer was then immersed upside down in a stationary water bath at 26°C for 15 minutes. It was then leached in static water at 60°C usually for about 2 days until the chloride ion content was less than 200 milligrams per square meter. The material was then dried at 100°C.

The dried material when stripped from the Vyon support weighed about 650 grams per square meter (as measured in accordance with British Standard Specification 3144/1959 using a 10 centimeter square sample). The substrate was about 1 mm. thick, the tie coats and topcoat together were about 0.7 mm. thick and material thus had a total thickness of about 1.7 mm and a calculated density of 0.3. The water vapour permeability of the material was about 3,000 gram per square meter, per 24 hours (measured in accordance with British Standard Specification 3177/1959 at 37°C with a nominal humidity gradient of 100% relative humidity). The notch tear strength was about 4 kilogrammes in the L and X directions (measured in accordance with British Standard Specification 2782/1965 at a rate of extension of 12 centimeters per minute). The tensile strength was about 7.5 kilogrammes per centimeter width in the L and X directions, and the elongation at break was about 270% in the L and X directions (both properties being measured in accordance with British Standard Specification 3144/1959 using a sample 10 centimeters long and 2 centimeters wide at a rate of extension of 12 centimeters per minute). The initial modulus was about 0.85 kilogrammes per centimeter in the L and X directions (being the load per centimeter width of the sample at 5% strain on the same test as for tensile strength). The material survived at room temperature more than 200,000 flex cycles before failure occurred on a "Bally Flexometer" manufactured by Bally & Co. (Schoenwerd dated 13th July 1960.) The hydrostatic head was about 190 millimeters of Mercury.

This material has a matt grey black surface on the exposed topcoat and a smooth fibrous appearance on the substrate surface which closely resembles the flesh surface of a natural hide leather. The top surface has numerous micro-pores opening through the top surface skin of the material. These in combination with the inherent water vapour permeability of very thin polyurethane membranes imparts the high water vapour permeability which is possessed by the material. The material can have its microscopic surface finish modified in any desired manner which will still leave the material sufficiently permeable for the end use intended for it.

However the preferred method of imparting a grain leather-like finish is to spray the surface with dimethylformamide.

The material made by this example was finished in the same way as the material made in Example 19 and then resprayed in the same way.

The surface took on a deeper glossier appearance and the fine hair crease pattern observed with a natural calf leather. Figures of the accompanying drawings show the finished surface as observed and photographed as described above with a stereoscan electron scanning microscope. Scales are shown on each of the photomicrographs. It will be observed that the edges of each of the pores opening through the surface are curved inwardly.

The material after being finished in this way had a reduced water vapour permeability of 2600, as compared with 3000 before finishing, which is still an excellent value and allows the material to be used as an excellent shoe upper material. The notch tear strength and the initial modulus appeared to be increased slightly.

The material was made up into mens welted stitched seat Blucher shoes both with and without wing caps using conventional American shoe making techniques. The shoes had a high quality appearance and excellent comfort properties.

EXAMPLE 21

This is an example of a material having a substrate and a topcoat made of very similar polyurethanes and a tie layer made of a softer polyurethane.

These two polyurethanes are made in the same manner as described in Example 19.

The physical properties of the topcoat polymer measured in the same way as in Examples 19 and 20 were as follows: tensile strength 7000 p.s.i., elongation at break 535%; hardness 55 D; tear strength 96 lbs. (per 0.1 inch thickness); and abrasion 355 (an index).

A 30% solution of the substrate polymer was prepared by dissolving 72 parts of the solid granulated polymer in 168 parts of N,N'-dimethylformamide and when the viscosity of the mixture during dissolution had risen to an estimated 80,000 centipoise adding a premixed blend of 0.36 parts water and 0.36 parts dimethylformamide (to stop the viscosity rising any higher). The temperature during mixing was kept not greater than 40°C. The solution was then milled. The viscosity of the solution measured 24 hours later was 205,000 centipoise and, before use, had fallen (after 12 days of storage) to 106,000 centipoise. 60 parts of it were mixed and milled with 32 parts of finely ground sodium chloride and 0.9 parts of carbon black pigment base containing 10% of carbon black. The salt had an average particle size of 17.75 microns with a positive deviation of 13.25 microns and a negative deviation of 8.25 microns. This measurement was made by sedimentation measurements as described above. The salt had a moisture content of 0.07%. The carbon black pigment base consisted of 20 parts of a 25% solution of the harder type of polyurethane in N,N'-dimethylformamide mixed with 8.8 parts of a 25% solution of the harder type of polyurethane in dimethylformamide, 14.4 parts of dimethylformamide, and 4.8 parts of carbon black.

Twenty-six days after the 30% solution was made up this paste, having a ratio of salt to polymer of 1.78:1, was deaired by being stirred under reduced pressure and then was spread as a 78 foot length on the smoother surface of a belt of low permeability filter grade sintered polyethylene as sold under the trade mark VYON as described above in Example 1. The spreading was done with a knife over roll device using a knife gap of 0.105 inches at a speed of 5 feet per minute; the layer was then immersed upside down in a stationary water bath at 18°C for 60 minutes, and then leached in cold water overnight and then dried at 100°C for 2 to 3 hours.

The substrate was then given a tie coat as follows.

A 23% solution of Estane 5701 F1 polyurethane was prepared by dissolving 30 parts of the solid polymer in 100.5 parts of dimethylcyclohexanone using a high speed high shear mixer, the temperature during dissolution being not greater than 45°C. 40 parts of this solution were then mixed and milled with 27.6 parts of the same finely ground salt as was used for the substrate and 3.2 parts of the same pigment base containing 14% Rajah Black carbon black as was used in the first tie layer in Example 20.

The viscosity of the solution before mixing was 58,000 centipoise and the viscosity of the paste was 320,000 centipoise.

This paste, having a salt to polymer ratio of 3:1, was then deaired and was then spread on the dried surface of the substrate using a knife over roll device with a knife gap of 0.015 inches at a speed of 1 foot per minute.

The layer was then led through an oven maintained at 110°C to remove the solvent and dry the tie coat.

A topcoat was then formed on the tie coat as follows:

A 25% solution of the topcoat polymer was prepared by dissolving 50 parts of the solid polymer in 150 parts of dimethylformamide. The solution had a viscosity of 21,000 centipoise. 10.28 parts of this solution were then mixed with 0.1 parts of dimethylformamide in which was mixed 0.1 parts of stabilizer for the polyurethane to degradation by ultraviolet rays, 2,2'-dihydroxy —4 methoxybenzophenone as is sold under the name CYASORB/U.V. 24 by American Cyanamid.

This mixture was then mixed and milled with 8.34 parts of finely ground sodium chloride and 1.39 parts of pigment base containing 10% of Rajah Black carbon black. The salt had an average particle size before milling of 13 microns with a positive deviation of 11.5 microns and a negative deviation of 7 microns. This measurement was made by sedimentation measurements as described above. The salt had a moisture content of about 0.15%.

The pigment base consisted of 10 parts by weight of a 25% solution of the harder type of polyurethane in dimethylformamide, 5 parts of dimethylformamide, and 1.2 parts of Rajah Black carbon black.

The topcoat paste, having a ratio of salt to polymer of 3:1, was then deaired by being stirred under reduced pressure and then was spread on the dried surface of the tie coat which had been preconditioned by being dried at 100°C for 15 minutes, as in Example 20, using a knife over roll device with a knife gap of 0.033 inches at a speed of 7 feet per minute. The layer was then immersed upside down in a counter current of water at 19°C for 30 minutes. The rate of flow of the water was 250 British gallons per hour through a tank having a capacity of about 170 gallons being 32 feet long, and 20 inches wide with the water level maintained at a depth of 6 inches.

It was then leached in static cold water as in Example 20 and dried and stripped from the Vyon support.

The material was then spray finished in the same manner as in Example 19 and then tested in the same way as the product of Example 20.

The substrate material weighed 527 grams per square meter and the complete material 676 grams per square meter. The sprayed and unsprayed material had a thickness of about 1.6 mm. Microscopic measurement indicated the substrate to be about 1.1 millimeters thick and the coating to be 0.5 millimeters thick.

The water vapour permeability of the unsprayed material was 3530 grams per square meter per 24 hours, and of the sprayed material 3380.

The notch tear strength of the finished material was about 4.6 kilogrammes in the L direction and 5.2 kilogrammes in the X direction. The tensile strength of the finished material was about 10.8 kilogrammes per centimeter in the L direction and about 11.4 kilogrammes per centimeter in the X direction. The elongation at break of the finished material was about 395% in the L direction and about 410% in the X direction.

The initial modulus of the finished material in the L and X directions was 1.25 kilogrammes per centimeter.

The coating adhesion of the finished material in both the L and X directions was about 2.1 kilogrammes per centimeter (measured in accordance with British Standard Specification 3424/1961 Appendix A).

The finished material had a depth of colour and "break" such as to enable it to closely resemble a high quality calf leather. The material survived 2½ hours flexing at −12°C before topcoat cracking propagated from the top surface occurred on the same machine as used in Example 20.

The material had a maximum pore size of 6.4 microns and an average pore size of 3.5 microns measured by the method described in Example 24.

The material was made into men's stitched mocassin toe Blucher oxford shoes by conventional American shoe making techniques.

EXAMPLE 22

This is an example of a single layer material made from a bulk polymerized polyurethane.

The polymer was made in the same way as the polymer used for the substrate in Example 19 except that instead of 22.7 parts of 1,4-butane-diol only 22 parts were used. 10 parts of a 30% by weight solution having a viscosity of 64,000 centipoise made from this solid polymer dissolved in N,N'-dimethylformamide were mixed and milled with 5.34 parts of finely ground sodium chloride, 0.6 parts of an ultra-violet ray absorber, namely Lanbro MK 446, 0.15 parts of an antioxidant, namely Irganox 1010, and 0.3 parts of a stabilizer against hydrolysis, namely Staboxol PCD.

The salt had an average particle size (before milling) of 13 microns with a positive deviation of 12.75 microns and a negative deviation of 6.5 microns. The Lanbro MK 446 material is a hydroxyl and methoxy substituted benzophenone similar to Cyasorb U. V. 24. The Irganox 1010 material is tetrakis [methylene 3-(3'5' ditertiary butyl 4' hydroxy phenyl) propionate] methane. The Staboxal PCD is a carbodiimide and acts as a stabilizer for polyurethanes against hydrolytic degradation.

This paste, having a salt to polymer ratio of 1.78:1, was deaired by being stirred under reduced pressure and then was spread as a 65 foot length on the smoother surface of a belt of low permeability filter grade sintered polyethylene as sold under the trade mark VYON as described in Example 1. The spreading was done with a knife over roll device using a knife gap of 0.150 inches at a speed of 5 feet per minute. The layer was then immersed upside down in a stationary water bath at 10°C for 4 hours, and then leached in cold water overnight and then dried at 100°C for 2 to 3 hours. The dried material had the following physical properties: an average thickness of 1.7 mm; an average weight of 840 grams per square meter and thus had a calculated density of 0.49; an average water vapour permeability of 3200; a microscopic pore structure with essentially no pores visible to the normal unaided eye in normal daylight; an average notch tear strength of 6.0 kilogrammes; an average hydrostatic head of 120 millimeters of mercury; an average tensile strength of 14.5 kilogrammes/centimeter; an average elongation at break of 435%; an average initial modulus of 1.1 kilogrammes/centimeter; a maximum pore size of 9.4 microns and an average pore size of 5 microns.

This material has excellent leather-like properties and is well suited for use in the fabrication of shoes to replace natural leather in the uppers thereof. It will be appreciated that it is suitable for many other uses where leather has hitherto been used. Surface finishes to adjust its surface finish can be used as desired for example spraying with dimethylformamide as described in Example 19 or treatment with dyes or lacquers to color or pigment the surface and any desired combinations of these or known leather finishing techniques.

The material was made into the same type of shoes as in Example 21 by conventional American shoe making techniques.

EXAMPLE 23

This is an example of a two layer material with a denser substrate and a less dense topcoat both made of the same polyurethane.

The polyurethane used for the substrate was made in the same way as that used in Example 22, ie. using the same procedure as in Example 19 but only 22 parts of 1,4-butane diol. The polyurethane used for the topcoat was made in the same way as the polymer for the substrate but had been heat cured.

60 kilogrammes of the substrate polymer were dissolved in 137.3 kilogrammes of N,N-dimethylformamide. 50 kilogrammes of this solution were then mixed and milled with 26.7 kilogrammes of ground sodium chloride and 0.75 kilogrammes of carbon black pigment base. The viscosity of the resulting paste was of the order to 200,000 to 500,000 centipoise at 20°C. The sodium chloride used had, before milling, a mean particle size of 13 microns with a positive deviation of 7.75 microns and a negative deviation of 6.5 microns. The salt also had a microcal anticaking agent content of about 0.9% and a moisture content of about 0.7%.

The carbon black pigment base was similar to the material used for the substrate paste in the other examples. 62 kilogrammes of the topcoat polymer were dissolved in 138.6 kilogrammes of N,N-dimethylformamide and 0.06 kilogrammes of methanol using a high speed high shear mixer and a further 0.06 kilogrammes of methanol were added (after 40 minutes of mixing) as a 10% solution in dimethylformamide to react with any free isocyanate groups.) 1 hour from the start the solution was removed from the mixer. The solution had a viscosity of the order of 168,000 to 200,000 centipoise.

37.3 kilogrammes of this solution were then mixed with 8.9 kilogrammes of dimethylformamide and 1 liter of 12.5% Staboxol solution in dichloromethane. 37.5 kilogrammes of the same ground sodium chloride as used in the substrate paste were then added together with 6.25 kilogrammes of Rajah Black carbon black pigment base and 250 grams of Cyasorb U.V. 24 and 65 grams of Irganox 1010. The viscosity of the resulting paste was of the order of 128,000 to 194,000 centipoise at 20°C.

The carbon black pigment base was made by slowly adding 8 kilogrammes of carbon black to 24 kilogrammes of dimethylformamide with thorough slow stirring. When thoroughly mixed 48 kilogrammes of a 25% by weight solution in dimethylformamide of the same type of polymer as that referred to as the topcoat polymer were added.

The rest of the process used the apparatus described in connection with Example 18.

The dunk tank contained static water at 30°C and the coating remained in the dunk tank for 2 hours after which time it had set to a self-supporting microporous form. It was then leached in water at 60°C. and dried.

The material had the following physical properties measured as in Example 21:

It had an even microporous structure free from macropores, (voids visible to the unaided human eye). It has a substrate thickness of about 1.2 millimeters and a topcoat thickness of 0.6 millimeters. It weighed 677 grams per square meter and had a calculated density of 0.37. It had a notch tear strength in the L direction of 4.0 kilogrammes and in the X direction of 4.8 kilogrammes. It had a water vapour permeability of 3420 grams per square meter per 24 hours. It had a tensile strength of 12.7 kilogrammes per centimeter in the L direction and 13.3 kilogrammes per centimeter in the X direction and an elongation at break of over 300%. It had an initial modulus of 1.2 kilogrammes per centimeter in the L direction and 1.0 kilogrammes per centimeter in the X direction. It had a maximum pore size of 13.8 microns and an average pore size of 7.9 microns, as measured in Example 25.

The material was then spray finished with dimethylformamide in a manner similar to that of Example 19. The material after spraying had a deep glossy black appearance and a good "break" so that it resembled a high quality calf grain leather. The water vapour permeability was now about 2100 grams per square meter per 24 hours.

The finished material was made into men's stitched 3 eyelet wing tip Blucher shoes (silhouwelt style) by conventional American shoemaking techniques.

EXAMPLE 24

This is an example of a single layer material made from a bulk polymerized polyurethane and is similar to Example 22.

The polymer was made similarly to the substrate polymer of Example 19; using 98 Kg. of polyester reacted with 22 Kg. of diol and 78.4 Kg. of diisocyanate.

The solid granulated resin had an intrinsic viscosity 0.43 deciliters per gram. 62 Kg. of this polyurethane resin were dissolved in 32 British gallons of dimethylformamide containing 50 grams of methanol in a high speed high shear mixer, over a period of 1¼ hours. The intrinsic viscosity of the polymer was now 0.9, the solids content of the solution 30.6% and the viscosity of the solution 312,000 centipoise.

48.4 Kg. of this solution were mixed and milled with 1.45 Kg. of dimethylformamide in which was dispersed 324 grams of CYASORB ultra violet ray stabilizer, 84.5 grams of IRGANOX antioxidant and 1950 ccs. of STA-BOXOL as a 12.5% solution in dichloromethane, and 26.7 Kg. of finely ground salt. The salt before milling had an average particle size of 14.6 microns with a positive deviation of 7.8 microns and a negative deviation of 7.5 microns. The salt had a moisture content of 0.38% and an anticaking agent, MICROCAL, content of 1.4%. Details of MICROCAL are given in Example 18.

The stabilizers were stirred into the resin solution initially at 20°C rapidly for 10 minutes and then the salt was added and the stirring continued.

The paste was then deaired and spread using a knife over roll coating device onto the smoother surface of a sheet of VYON having the same properties as in Example 21. The gap setting used was 0.090 inches and the coating speed was 5 feet per minute. The layer was then immersed upside down in a static water bath at 20°C for 18 hours. It was then passed through a leaching tank against a counter current of water at 1 foot per minute for about 1 hour. The temperature of the water was 60°C. This removed a substantial amount of the salt so that the chloride content in milligrams per square meter fell from about 5000 before the leaching treatment to about 550 after it. The material was then heated for 55 minutes at 98°C to dry it and was then stripped from the VYON support.

The material had a microscopic pore structure containing substantially no pores visible to the unaided normal human eye in normal daylight.

The material had the following physical properties (measured as in Examples 20 and 21): an average thickness of 1.0 millimeters, an average weight of 510 grams per square meter and thus a calculated density of 0.51; a notch tear strength of 2.7 kilogrammes in the machine or L direction and 3.1 kilogrammes in the transverse or X direction; a hydrostatic head of 110 millimeters of mercury; a tensile strength in the L direction of 11 kilogrammes per centimeter and in the X direction of 9 kilogrammes per centimeter; an elongation at break of 470% in the L direction and 500% in the X direction; an initial modulus at 5% extension in the L direction of 1.1 kilogrammes per centimeter and in the X direction of 1.0 kilogrammes per centimeter; and a maximum pore size of 9.5 microns and an average pore size of 6.4 microns measured as follows:

The apparatus used consists of an air supply controlled by a pressure regulator and the pressure measured by a pressure gauge reading 20 p.s.i., plus a water or mercury manometer for greater sensitivity and a test jig. The test jig is a metal cylindrical cell fitted with an air inlet attached to the controlled air supply has a top opening of about 3 cm. internal diameter, with a flat machined face, fitted with a screw-on clamping ring designed to retain a small pool of liquid on the surface of the test piece when the cell is assembled.

Circular samples to fit the test cell are thoroughly saturated with the test liquid (n-propanol) and held firmly over the aperture of the test cell, top coating side up, by means of the clamping ring. The surface of the sample is covered with a shallow layer of the test liquid. The air pressure is increased, and when air bubbles break from the surface of the sample at one location, the pressure is recorded and relates to the maximum pore size. The pressure is increased further until bubbles emerge uniformly from the whole of the surface, at this point the pressure which relates to the average pore size is also recorded. The pressure readings are converted to equivalent pore diameters in microns, using the following equation.

$$d = 30 \; T/P$$

Where T = surface tension of the liquid in dynes/cm. (n-propanol = 24 dynes/cm.) and P = pressure in mm. of mercury.

The material has a similar utility to that of the product of Example 22. After finishing it was made into women's plain toe seamless cement pumps by conventional American shoemaking techniques.

In this application all proportions are by weight unless otherwise indicated.

In highly preferred forms of the invention the men's weight microporous material (about 1.7 mm thick) has an initial modulus (at 5% elongation) of at least 0.7 Kg/cm (e.g. in the range of about 0.8 to 1.5 Kg/cm) and a notch tear strength of at least about 4 Kg (e.g. in the range of about 4½ to 7 Kg). Most preferably the modulus at 25% elongation is at least 2½ or 3 Kg/cm. The women's weight material (about 1 mm thick) may have a lower modulus at 25% elongation and lower notch tear strength but preferably these values are at least about 1.6 Kg/cm and at least about 3 Kg respectively.

It is understood that the foregoing detailed description is given merely by way of illustration and that variations may be made therein without departing from the spirit of the invention.

We claim:

1. In a lasted shoe upper having in place of the upper leather thereof a water vapour permeable artificial leather sheet material which consists essentially of a strength-giving base layer forming the major part of the thickness of the material and a microporous non-cellular surface layer of elastomeric polyurethane on said base layer, the improvement wherein said strength-giving base layer consists essentially of microporous water-vapour permeable elastomeric polyurethane, the polyurethane of said microporous surface layer being the same as the polyurethane of said microporous base layer, said surface layer having a thickness of more than 0.005 inch and less than 0.05 inch and being more open and less dense, less tough, and more permeable to water vapour than said base layer, said layers being free of fibrous reinforcement and thereby having the elastomeric characteristics of said elastomeric polyurethane on stretching, and said shoe upper being resistant to formation of 'orange peel' surface effects when stretched in the lasting operation employed in its manufacture, said strength-giving base layer free from fibrous reinforcement being prouduced by a method which comprises forming on a support a continuous layer of a solution of elastomeric polyurethane working material in a solvent therefor, coagulating said layer, having said composition, by means of coagulating liquid, removing substantially all the solvent of said layer by washing with coagulating liquid, the coagulating liquid being a nonsolvent for said elastomeric working material and being at least partially miscible with the solvent for the elastomeric working material, and drying the resulting water vapor permeable flexible sheet material, said method including the step of stripping the coagulated layer from the support.

2. A lasted shoe upper as in claim 1 in which each of said microporous layers is produced by coagulating with water a dispersion of microscopic salt particles in a viscous solution of said polyurethane in dimethylformamide.

3. A lasted shoe upper as in claim 1 in which said microporous surface layer has at its exposed surface a thin skin of polyurethane.

4. A lasted shoe upper as in claim 1, said surface layer and said base layer being non-cellular in that they are free of macropores, said macropores being pores of such size as to be visible to the unaided eye when a cross section of the sheet is viewed in normal daylight.

5. A lasted shoe upper as in claim 1 in which the face of said base layer within said sheet is free of collapsed micropores.

6. A lasted shoe upper as in claim 2 in which the weight ratio of salt to polyurethane in the dispersion forming said surface layer is 3:1 and said ratio in the dispersion forming said base layer is below 3:1.

7. A lasted shoe upper as in claim 6 in which said ratio is the dispersion forming said base layer is 1.5:1 to 2:1.

8. A lasted shoe upper as in claim 21 in which the weight ratio of salt to polyurethane in the dispersion forming said base layer is 1:1 to 2.5:1 and is lower than the weight ratio of salt to polyurethane in the dispersion forming said surface layer.

* * * * *